United States Patent
Van Den Brink et al.

(10) Patent No.: US 6,863,288 B2
(45) Date of Patent: Mar. 8, 2005

(54) TILTING VEHICLE PROVIDED WITH STEERABLE REAR WHEELS

(75) Inventors: Christopher Ralph Van Den Brink, Puttershoek (NL); Hendrik Marinus Kroonen, Zwijndrecht (NL)

(73) Assignee: Brinks Westmaas B.V., 's-Gravendeel (NL)

( * ) Notice: Subject to any disclaimer, the term of this patent is extended or adjusted under 35 U.S.C. 154(b) by 0 days.

(21) Appl. No.: 10/276,556

(22) PCT Filed: May 18, 2001

(86) PCT No.: PCT/NL01/00378

§ 371 (c)(1),
(2), (4) Date: Jun. 26, 2003

(87) PCT Pub. No.: WO01/87689

PCT Pub. Date: Nov. 22, 2001

(65) Prior Publication Data

US 2004/0100059 A1 May 27, 2004

(30) Foreign Application Priority Data

May 18, 2000 (NL) .............................................. 1015233

(51) Int. Cl.⁷ ................................................. B62D 9/02
(52) U.S. Cl. .............................................. 280/124.103
(58) Field of Search ................... 280/124.103, 124.104, 280/124.106, 124.107, 124.11, 124.111

(56) References Cited

U.S. PATENT DOCUMENTS

| | | | | |
|---|---|---|---|---|
| 4,550,926 A | * | 11/1985 | MacIsaac | 280/5.509 |
| 5,921,338 A | * | 7/1999 | Edmondson | 180/65.5 |
| 6,467,783 B1 | * | 10/2002 | Blondelet et al. | 280/124.106 |

FOREIGN PATENT DOCUMENTS

| | | |
|---|---|---|
| EP | 0 878 378 | 11/1998 |
| WO | WO 99 14099 | 3/1999 |

* cited by examiner

*Primary Examiner*—Faye M. Fleming
(74) *Attorney, Agent, or Firm*—Young & Thompson

(57) ABSTRACT

A tilting vehicle with a front frame section has a longitudinal axis, a driver's seat and one or more wheels that are able to turn about a front wheel steering axis located transversely to the longitudinal axis. The vehicle has a rear frame section with two wheels that is connected to the front frame section such that it can tilt. The vehicle can have a tilting device operated by the driver, for relative tilting of the front and rear frame sections. A sensor measures a force or movement on the front wheel for controlling the tilting device. The rear wheels can be turned about a rear wheel steering axis located transversely to the longitudinal axis or can be tilted about a rear wheel tilt axis located essentially in the direction of the longitudinal axis in order to prevent oscillations of the vehicle at relatively high speeds.

18 Claims, 3 Drawing Sheets

TILTING VEHICLE PROVIDED WITH STEERABLE REAR WHEELS

Figure 1:
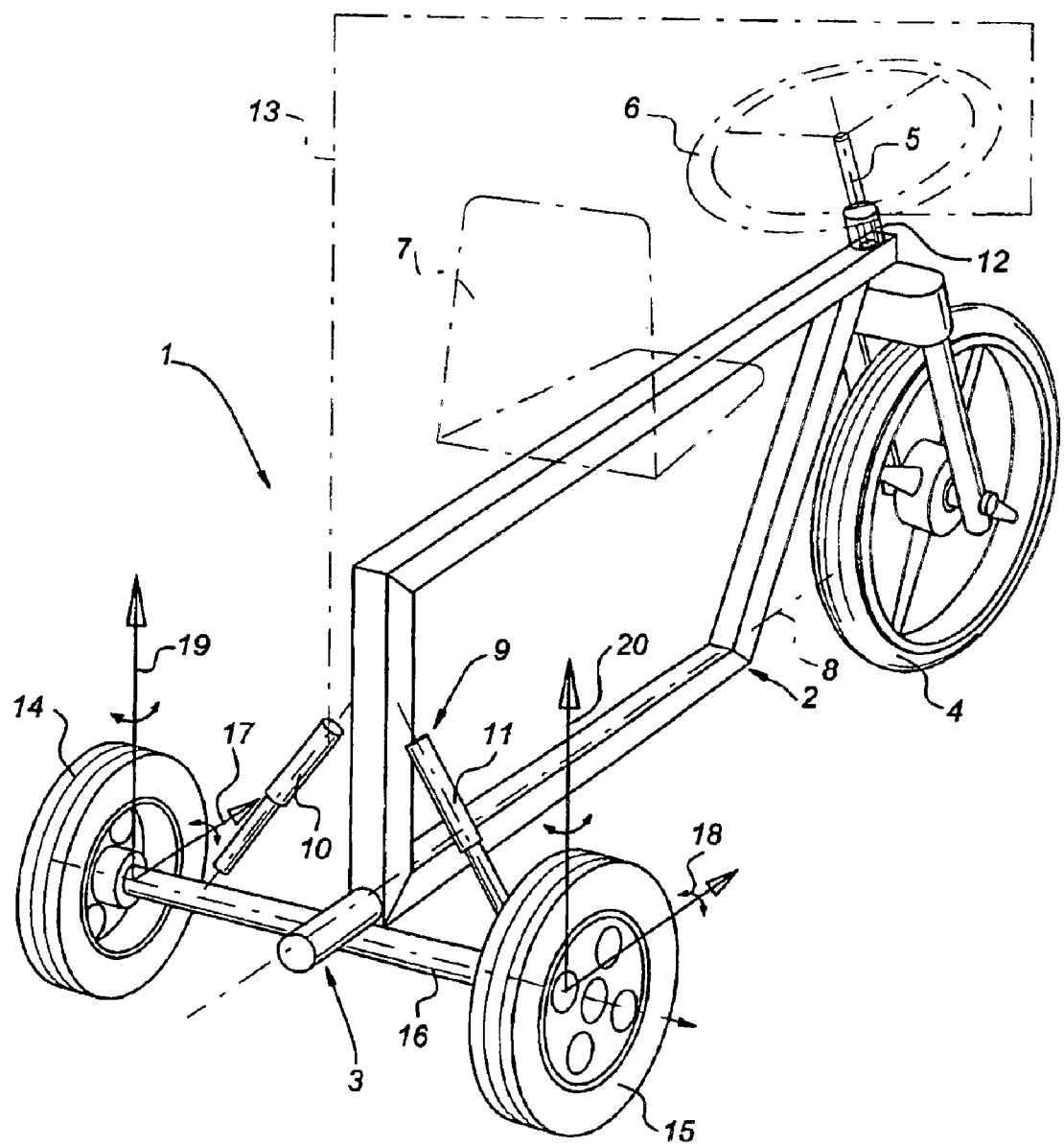

The application relates to a tilting vehicle comprising a front frame section, having a longitudinal axis, a driver's seat and one or more wheels that are able to turn about a front wheel steering axis located transversely to the longitudinal axis, and a rear frame section with two wheels that is connected to the front frame section such that it can tilt about a tilt axis located essentially in the direction of the longitudinal axis.

A tilting vehicle of this type is disclosed in International Patent Application no. WO 95/34459 in the name of the Applicant.

In the case of the known tilting vehicle the front frame section is tilted with respect to the rear frame section by two cylinders when taking a bend. The front frame section has one wheel, whilst the rear frame section is provided with two wheels. The moment on the front wheel about the front wheel steering axis is measured by a force sensor. A control signal, that drives the tilting cylinders, is produced from this moment, as a result of which inherently stable tilting is obtained. The movement of the tilting cylinders is deactivated at the point in time when the force or the moment on the front wheel is zero, which is the case at the point in time when, depending on the radius of the bend, the speed of the vehicle and the weight thereof, including driver, the correct degree of tilt for taking the bend has been obtained. When the force or the moment on the front wheel about the front wheel steering axis is zero, the titled position of the front frame section is kept constant. It is also possible to construct the sensor as a position indicator, as described in International Patent Application no. WO 99/14099 in the name of the Applicant. With this arrangement the driver can activate the tilting cylinders by turning a steering element with respect to the front wheel steering axis, the front wheel being steered through the correct angle automatically and as a function of the speed at the same time by the tilting mechanism described in the said patent.

However, it has been found that at high speeds, that is to say above approximately 60 km per hour, unstable zig-zagging of the entire vehicle occurs, both when driving straight ahead and when taking a bend. As a result undesired oscillations occur in the tilting cab, as a result of which the handling of the tilting vehicle is adversely affected.

One aim of the present invention is to provide a tilting vehicle with which oscillations are avoided even at relatively high speeds.

To this end the tilting vehicle according to the invention is characterized in that the wheels of the rear frame section can be turned about a rear wheel steering axis located essentially transversely to the longitudinal axis or can be tilted about a rear wheel tilt axis located essentially in the direction of the longitudinal axis.

The invention is based on the insight that with tilting of the front frame section and the corresponding sloping position that is assumed by the front wheel the rear wheels require a relatively long time to build up transverse force. By, according to the invention, also steering the rear wheels, as a function of the tilt, about an essentially vertically oriented rear wheel steering axis or by tilting the rear wheels about a rear wheel tilt axis that runs essentially in the longitudinal direction, the rear wheels are able to build up a sufficiently high transverse force sufficiently quickly and the relatively unstable oscillating handling at high speeds, both when taking bends and when driving straight on, is completely eliminated whilst retaining advantageous steering characteristics and steering feel for the driver.

Tilting of the front frame section can be driven by self-balancing on the part of the driver by means of front wheel steering and shifting weight. In this case the tilting vehicle is not provided with active tilting means.

Preferably, however, the tilting vehicle has actively driven tilting with a tilting device that can be activated by a driver and is connected on the one hand to the front frame section and on the other hand to the rear frame section for relative tilting of the frame sections about the tilt axis, and a sensor for producing a control signal, as a function of the relative tilting of the front and rear frame sections, for control of the tilting device.

In a preferred embodiment the rear wheels are each independently suspended on their own rear wheel steering axis. The rear wheels are connected via a steering arm located transversely to the rear wheel steering axis and via a track rod in each case to a crank arm located on the longitudinal axis. This crank arm is connected to the front frame section such that it can turn about the longitudinal axis and extends transversely to the longitudinal axis. On tilting the front frame section about the longitudinal axis, the crank arm is turned so that the steering arms of the rear wheels are moved and steering of the rear wheels that is depending on the length of the crank arm is obtained. The degree of steering can be accurately adjusted by variation of the geometry of the crank arm and the steering arm.

Figure 2:
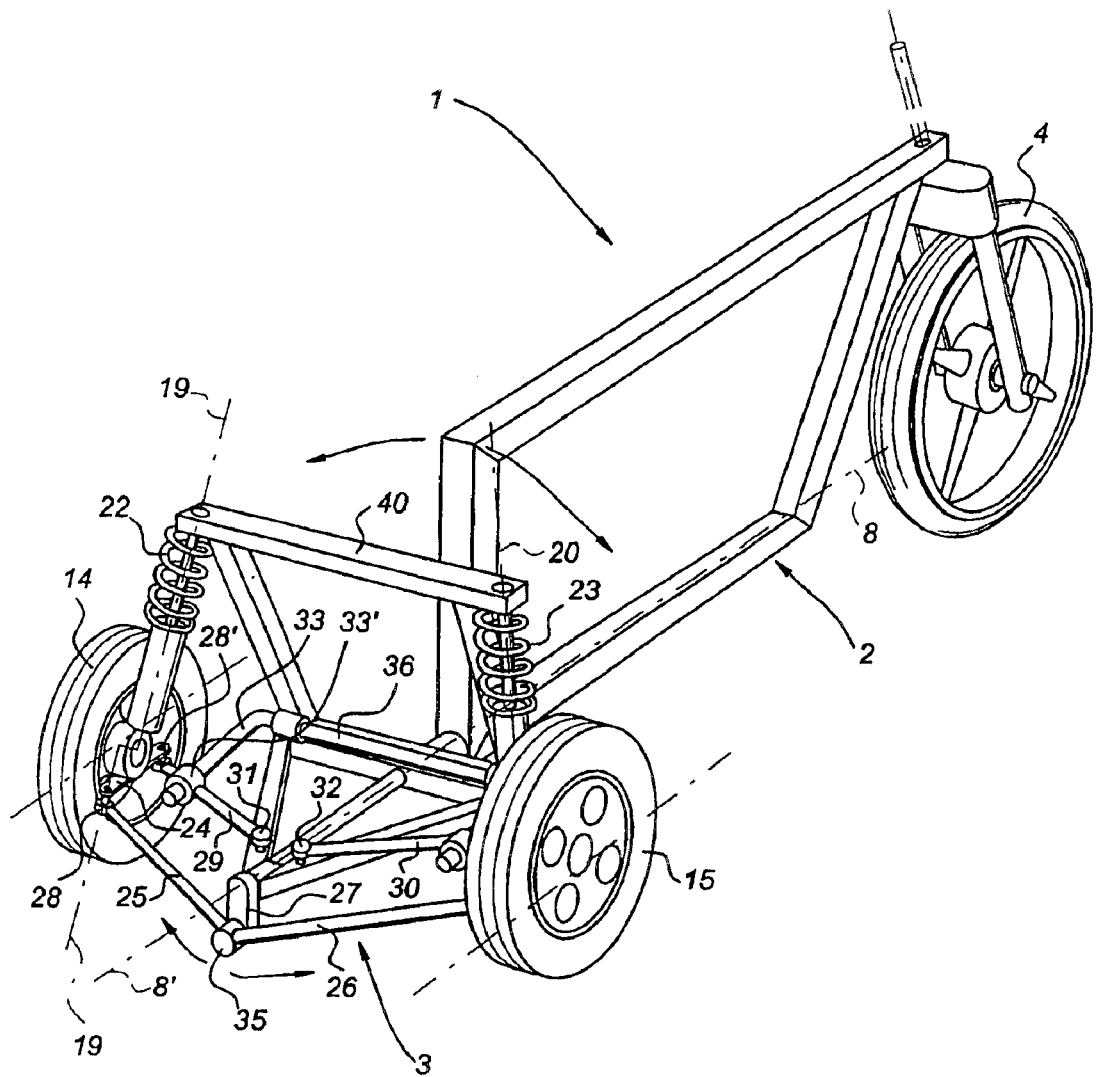
Figure 3:
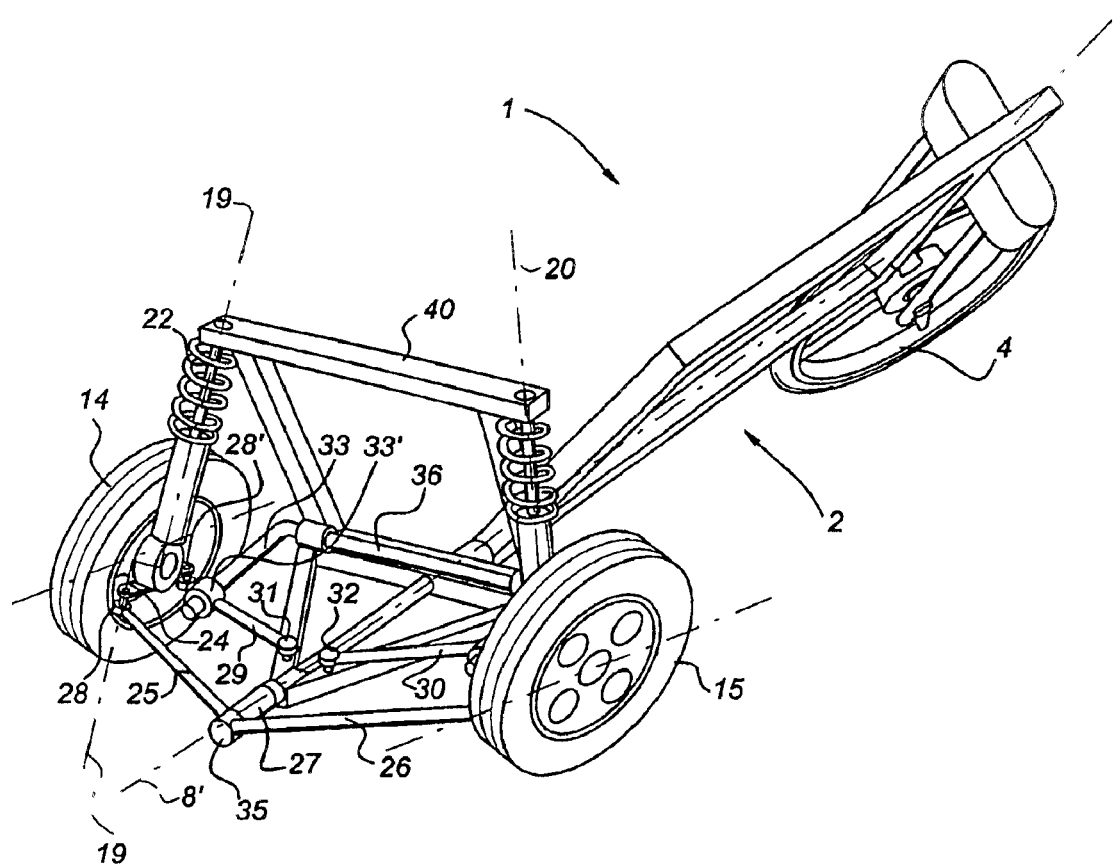

A few embodiments of a tilting vehicle according to the invention will be explained in more detail with reference to the appended drawing. In the drawing:

FIG. 1 shows a diagrammatic, perspective view of the frame of a tilting vehicle according to the present invention, and FIGS. 2 and 3 show a preferred embodiment of a steering construction for the rear wheels of the tilting vehicle according to the present invention.

FIG. 1 shows, diagrammatically, a chassis of a tilting vehicle 1 according to the invention provided with a front frame section 2 and a rear frame section 3 connected to the front frame section 2 such that it can tilt. The front frame section 2 has a front wheel 4 that can be turned about a front wheel steering axis 5, shown diagrammatically, by means of a steering wheel 6. The front frame section 2 has a driver's seat 7, indicated diagrammatically in the figure. The front frame section 2 can be tilted about tilt axis 8', which in FIG. 1 is coincident with a longitudinal axis 8. Tilting of front frame section 2 is driven by a tilting device 9, comprising to hydraulic cylinders 10, 11 which at one end are connected to the rear frame section 3 and at the other end to the front frame section 2. The hydraulic cylinders 10, 11 are connected to a control unit that is not indicated in more detail in the figure. When the driver turns the steering wheel 6 of the steering force or the steering moment on the front wheel 4 is measure with the aid of a sensor 12. The tilting device 9 is activated, via a line 13 that is indicated diagrammatically, by the sensor 12 to tilt the front frame section 2 relative to the rear frame section 3. Tilting continues as long as the force or the moment detected by the sensor 12 is not zero. When the force or the moment registered by the sensor 12 is zero, the front frame section 2 is held in the tilted position achieved and the cylinders 10, 11 and fixed in that position. Instead of a force or moment sensor 12 it is also possible to use an angle sensor as described in International Patent Application no. WO99/14099 in the name of the Applicant.

It is also possible to drive the titling by a computer on the basis of accelerations or angular positions of the front frame section, speeds and/or angular positions of the front wheel 4 detected by sensors. The invention is also applicable to tilting vehicles in which the tilting device 9 is omitted.

The position of the rear wheels 14, 15 is adjustable in order to prevent oscillations at relatively high speeds, both when driving straight on and when taking a bend. The rear wheels 14, 15 can be steerable about a rear wheel steering axis 19, 20 which is essentially perpendicular to the longitudinal axis 8. The rear wheels 14, 15 can also be connected to a rear axle 16 such that they are able to tilt, that is to say that the plane of the rear wheels can be tilted about a rear wheel tilt axis 17, 18 that runs essentially in the direction of the longitudinal axis 8, use being made of the steering characteristics of the tilted tyres 14, 15. The drive for tilting about rear wheel tilt axis 17, 18 or rotation about rear wheel steering axis 19, 20 can be dependent on a large number of measurement signals, such as the tilt angle of the front frame section 2, the tilt speed or tilt acceleration f the front frame section 2, the roll angle, roll speed or roll acceleration of the non-tilting rear frame section 3, the tyre forces on the rear wheels 14, 15, or combinations thereof. It has been found that undesired oscillations in the handling of tilting vehicles can be counteracted by correct steering of the rear wheels 14, 15.

FIG. 2 shows a preferred embodiment with independently suspended rear wheels 14, 15, each of which is suspended such that it can turn about its own rear wheel steering axis 19, 20. The rear wheels 14, 15 are each suspended via an individual shock absorber 22, 23 on a supporting member 40 of the rear frame section 3. The rear wheels 14, 15 are each provided with a steering arm 24, which steering arms 24 are connected via a track rod 25, 26 to the end of a crank arm 27. The track rods 25, 26 are connected via respective ball joints 28 to the end of the respective steering arm 24. The crank arm 27 is rigidly connected to the front frame section 2 and is rotated about the longitudinal axis 8 on tilting of the front frame section 2. As a result the ends of the steering arms 24 are moved and turning of the rear wheels 14, 15 about the rear wheel steering axes 19, 20 takes place, which rear wheel steering axes run through the upper mounting point of the shock absorbers 22, 23 and the ball joint 28.

A second end 28' of the steering arms 24 is connected to the rear frame section 3 via the transverse arms 29, 30 and ball joints 31, 32 at the end of the transverse arms 29, 30. The transverse arms 29, 30 are each connected via a rubber suspension 33' to a longitudinal guide 33, which longitudinal guides are joined to one another by torsion bar 36, which also serves as roll stabiliser for the rear frame section 3.

As shown in FIG. 3, on tilting the front frame section 2 to the right (viewed from the driver's position) the crank arm 27 will be rotated to the left, as a result of which the wheels 14, 15 turn to the right about the rear wheel steering axes 19, 20. As a result the rear wheels 14, 15 are able to build up transverse force sufficiently rapidly to obtain advantageous handling in the bends, which is important mainly at speeds above 60 km per hour. Adjustment of the degree of steering of the rear wheels 14, 15 can be obtained by varying the length of the crank arm 27, the length of the steering arm 24 or the position of the fixing point 36 of the track rods 25, 26 on the crank arm 27.

Although the invention has been described with reference to a tilting vehicle having a single front wheel 4 it is also possible to employ this invention with a tilting vehicle provided with two front wheels.

What is claimed is:

1. Tilting vehicle (1) comprising a front frame section (2), having a longitudinal axis (8), a driver's seat (9) and one or more wheels (4) that are able to turn about a front wheel steering axis (5) located transversely to the longitudinal axis (8), and a rear frame section (3) with two wheels (14, 15) that is connected to the front frame section (3) such that it can tilt about a tilt axis (8') located essentially in the direction of the longitudinal axis, characterized in that the wheels (14, 15) of the rear frame section (3) can be turned about a rear wheel steering axis (19, 20) located essentially transversely to the longitudinal axis (8) or can be tilted about a rear wheel tilt axis (17, 18) located essentially in the direction of the longitudinal axis (8).

2. Tilting vehicle (1) according to claim 1, charaterized in that the wheels (14, 15) of the rear frame section (3) are each connected to the rear frame section (3) via a respective essentially vertically oriented rear wheel steering axis (19, 20).

3. Tilting vehicle (1) according to claim 2, characterized in that the wheels (14, 15) of the rear frame section (3) are each provided with a steering arm (24) that is located transversely to the rear wheel steering axis (19, 20) and is connected by a free end, via a respective track rod (25, 26), to a crank arm (27) that is connected to the front frame section (2) such that it can turn about the longitudinal axis (8), and which extends transversely to the longitudinal axis (8) and is turned about the longitudinal axis (8) by the front frame section (2) on tilting of the front frame section (2) about the tilt axis (8').

4. Tilting vehicle (1) according to claim 3, characterized in that the steering arm (24) is attached by a second end, via a first joint (28'), to a transverse arm (29, 30) that is essentially parallel to the corresponding track rod (25, 26) and that is connected via a second joint (32, 32) to the rear frame section (3).

5. Tilting vehicle (1) according to claim 4, characterized in that the transverse arms (29, 30) of the rear wheels (14, 15) are each connected via a rotary joint (33') to a longitudinal guide (33) that extends in the direction of the longitudinal axis (8).

6. Tilting vehicle (1) according to claim 5, characterized in that the longitudinal guides (33) for each parallel arm (29, 30) are connected to one another by a torsion bar (36) located transversely to the longitudinal direction (8).

7. Tilting vehicle (1) according to one of claim 2, characterized in that the rear wheel steering axes (19, 20) are not perpendicular to the longitudinal axis (8), are each independently suspended on the rear frame section (3) and are each provided with a shock absorber (22, 23).

8. Tilting vehicle according to claim 1, wherein the vehicle is provided with a tilting device (9) that can be activated by a driver and is connected at one end to the front frame section (2) and at a second end to the rear frame section (3) for relative tilting of the frame sections about the tilt axis (8'), and a sensor (12) producing a control signal, as a function of the relative tilting of the front and rear frame sections, for control of the tilting device (9).

9. Tilting vehicle (1) according to claim 3, characterized in that the rear wheel steering axes (19,20) are not perpendicular to the longitudinal axis (8), are each independently suspended on the rear frame section (3) and are each provided with a shock absorber (22,23).

10. Tilting vehicle (1) according to claim 4, characterized in that the rear wheel steering axes (19,20) are not perpendicular to the longitudinal axis (8), are each independently suspended on the rear frame section (3) and are each provided with a shock absorber (22,23).

11. Tilting vehicle (1) according to claim 5, characterized in that the rear wheel steering axes (19,20) are not perpendicular to the longitudinal axis (8), are each independently suspended on the rear frame section (3) and are each provided with a shock absorber (22,23).

12. Tilting vehicle (1) according to claim 6, characterized in that the rear wheel steering axes (19,20) are not perpendicular to the longitudinal axis (8), are each independently suspended on the rear frame section (3) and are each provided with a shock absorber (22,23).

13. Tilting vehicle according to claim 2, wherein the vehicle is provided with a tilting device (9) that can be activated by a driver and is connected at one end to the front frame section (2) and at a second end to the rear frame section (3) for relative tilting of the frame sections about the tilt axis (8'), and a sensor (12) producing a control signal, as a function of the relative tilting of the front and rear frame sections, for control of the tilting device (9).

14. Tilting vehicle according to claim 3, wherein the vehicle is provided with a tilting device (9) that can be activated by a driver and is connected at one end to the front frame section (2) and at a second end to the rear frame section (3) for relative tilting of the frame sections about the tilt axis (8'), and a sensor (12) producing a control signal, as a function of the relative tilting of the front and rear frame sections, for control of the tilting device (9).

15. Tilting vehicle according to claim 4, wherein the vehicle is provided with a tilting device (9) that can be activated by a driver and is connected at one end to the front frame section (2) and at a second end to the rear frame section (3) for relative tilting of the frame sections about the tilt axis (8'), and a sensor (12) producing a control signal, as a function of the relative tilting of the front and rear frame sections, for control of the tilting device (9).

16. Tilting vehicle according to claim 5, wherein the vehicle is provided with a tilting device (9) that can be activated by a driver and is connected at one end to the front frame section (2) and at a second end to the rear frame section (3) for relative tilting of the frame sections about the tilt axis (8'), and a sensor (12) producing a control signal, as a function of the relative tilting of the front and rear frame sections, for control of the tilting device (9).

17. Tilting vehicle according to claim 6, wherein the vehicle is provided with a tilting device (9) that can be activated by a driver and is connected at one end to the front frame section (2) and at a second end to the rear frame section (3) for relative tilting of the frame sections about the tilt axis (8'), and a sensor (12) producing a control signal, as a function of the relative tilting of the front and rear frame sections, for control of the tilting device (9).

18. Tilting vehicle according to claim 7, wherein the vehicle is provided with a tilting device (9) that can be activated by a driver and is connected at one end to the front frame section (2) and at a second end to the rear frame section (3) for relative tilting of the frame sections about the tilt axis (8'), and a sensor (12) producing a control signal, as a function of the relative tilting of the front and rear frame sections, for control of the tilting device (9).

\* \* \* \* \*